(12) United States Patent
von Engelbrechten

(10) Patent No.: US 6,325,381 B1
(45) Date of Patent: Dec. 4, 2001

(54) HIGH-PRESSURE ROTARY SEAL

(75) Inventor: Arnold Arvid Wilhelm Jan von Engelbrechten, Cleveland Heights, OH (US)

(73) Assignee: System Seals, Inc., Cleveland, OH (US)

( * ) Notice: Subject to any disclaimer, the term of this patent is extended or adjusted under 35 U.S.C. 154(b) by 0 days.

(21) Appl. No.: 09/304,931

(22) Filed: May 4, 1999

(51) Int. Cl.[7] ........................................ F16J 15/34
(52) U.S. Cl. .......................... 277/361; 277/372; 277/374
(58) Field of Search ..................................... 277/361, 364, 277/370, 371, 372, 374, 387, 388, 407, 944, 358

(56) References Cited

U.S. PATENT DOCUMENTS

| | | | |
|---|---|---|---|
| 1,849,359 | * | 3/1932 | Braden .................................. 277/361 |
| 3,048,413 | * | 8/1962 | Wood .................................... 277/361 |
| 3,379,443 | * | 4/1968 | Park et al. ......................... 277/372 X |
| 3,718,336 | * | 2/1973 | Jackson et al. ....................... 277/372 |
| 3,764,149 | | 10/1973 | Zillman . |
| 3,799,559 | * | 3/1974 | Kayser .................................. 277/374 |
| 4,161,317 | * | 7/1979 | Sakamaki .............................. 277/25 |
| 4,618,154 | * | 10/1986 | Freudenthal ......................... 277/556 |
| 4,906,008 | * | 3/1990 | Warner ................................. 277/370 |
| 5,024,451 | * | 6/1991 | Borowski ............................. 277/412 |
| 5,067,733 | | 11/1991 | Nagai et al. . |
| 5,114,163 | | 5/1992 | Radosav et al. . |
| 5,217,232 | * | 6/1993 | Makhobey .............................. 277/26 |
| 5,480,161 | * | 1/1996 | Borowski ............................. 277/419 |
| 5,490,682 | | 2/1996 | Radosav et al. . |
| 5,901,965 | * | 5/1999 | Ringer et al. ..................... 277/361 X |
| 5,908,195 | * | 6/1999 | Sharrer ................................. 277/412 |
| 6,045,135 | * | 4/2000 | Feistel ................................. 277/434 |

* cited by examiner

Primary Examiner—Lynne H. Browne
Assistant Examiner—David E. Bochna
(74) Attorney, Agent, or Firm—Fay, Sharpe, Fagan, Minnich & McKee, LLP

(57) ABSTRACT

A rotary seal adapted for placement on an associated rotating shaft to inhibit fluid flow between the shaft and an associated housing includes an annular main seal member having a peripheral surface, an inner surface defining a central opening, and first and second transverse faces. One of the transverse faces defines a sealing face adapted for sealingly abutting a transverse surface of the associated shaft in a substantially fluid-tight manner. A resilient annular sealing member circumscribes the main seal member and projects radially outwardly therefrom. The resilient annular sealing member is, thus, adapted to sealingly engage the associated housing and the main seal member to inhibit fluid flow therebetween. The resilient sealing member also rotatably fixes the main seal member to the associated housing. An inner ring member is slidably received in a groove defined in the inner surface of the main seal member. The inner ring member is closely received on the associated shaft and is adapted to exert axial force on the main seal member in a first direction in response to fluid pressure exerted on the inner ring member in the first direction.

14 Claims, 5 Drawing Sheets

HIGH-PRESSURE ROTARY SEAL

BACKGROUND OF THE INVENTION

The present invention relates o the fluid sealing arts. More particularly, the present invention relates to a high-pressure rotary face seal for inhibiting fluid flow between a housing and a shaft which rotate relative to each other.

Mechanical face seals for use in rotary applications are well known. These seals are used in pumps, compressors, agitators, mixers, and a wide variety of other apparatus including a housing in which a shaft is supported for rotation. The face seals inhibit fluid flow between the housing and shaft.

While prior face seals have been found to be generally effective, they have not been found to be sufficiently long-lasting. This has necessitated their frequent replacement which results in down-time for the relevant apparatus. Even when these prior seals have been split to facilitate their removal from and installation on an associated shaft, at least, machine down-time is still significant.

Prior seals have been found to be relatively high-cost, unduly complex (e.g., multiple slits), and have also required relatively large amounts of space for installation. The complexity and space requirements have prevented such prior seals from being used in "closed" applications, i.e., applications where the seal must be installed inside of a fixed housing or the like where no access to the ultimate seal location is permitted. Thus, for example, these prior seals would not be usable in a "closed-groove" applications where a seal member must be installed in a grove circumscribing a shaft or the like, and wherein the shaft must then be axially inserted into a closed housing. Furthermore, in such closed-groove applications, multiple sealing points are often required (due to the presence of multiple fluid ports for communicating fluid from outside of the housing into passages extending through the shaft), and prior seals are not practical in such cases due to space, complexity, and cost considerations.

Another deficiency associated with known face seals is their diminished effectiveness at low fluid pressures. This results when low-pressure fluid is able to "seep" past the seal without engaging the seal and urging it into its operative sealing condition. Thus, for example, with prior seals, fluid is able to move past the seal for at least an initial period of time until sufficient fluid pressure is exerted on the seal to urge it into sealing engagement with the shaft or other component.

In light of the foregoing deficiencies and others associated with prior mechanical rotary face seals, it has been deemed desirable to develop a new and improved rotary face seal which overcomes these deficiencies and others while providing better and more advantageous overall results.

SUMMARY OF THE INVENTION

In accordance with the present invention, a new and improved rotary face seal is provided.

In accordance with a first aspect of the present invention, a rotary seal is adapted for placement on an associated rotating shaft to inhibit fluid flow between the shaft and an associated housing. The seal includes an annular main seal member having a peripheral surface, an inner surface defining a central opening, and first and second transverse faces. One of the transverse faces defines a sealing face adapted for sealingly abutting a transverse surface of the associated shaft in a substantially fluid-tight manner. A resilient annular sealing member circumscribes the main seal member and projects radially outwardly therefrom. The resilient annular sealing member is, thus, adapted to sealingly engage the associated housing and the main seal member to inhibit fluid flow therebetween. The resilient sealing member also rotatably fixes the main seal member to the associated housing. An inner ring member is slidably received in a groove defined in the inner surface of the main seal member. The inner ring member is closely received on the associated shaft and is adapted to exert axial force on the main seal member in a first direction in response to fluid pressure exerted on the inner ring member in the first direction.

In accordance with another aspect of the present invention, a seal assembly includes an inner ring member adapted for co-axial placement on an associated shaft in the region of a transverse shaft face and at least substantially circumscribes the associated shaft. A main annular seal member is adapted for co-axial placement on the associated shaft in a manner circumscribing the shaft and in covering relation with the inner ring. The main seal member includes an annular sealing face adapted for sealingly engaging the transverse shaft face to inhibit fluid flow between said main seal member and the transverse shaft face. An annular outer seal member is received on a peripheral surface of said main seal member and projects radially outwardly therefrom. The outer seal member is arranged co-axially with the associated shaft and is adapted to inhibit fluid flow between the peripheral surface of the main seal member and a housing surrounding the associated shaft.

In accordance with a further aspect of the present invention, an apparatus includes a housing defining a cylindrical bore and a shaft co-axially supported in the bore for rotation relative to the housing. The shaft includes a transverse face. A seal assembly is positioned co-axially on the shaft and radially between the shaft and housing for inhibiting fluid flow between the shaft and housing. The seal assembly, itself, includes a main seal member defined by at least an inner surface, an outer surface, and first and second side surfaces arranged transverse to the inner and outer surfaces. The second transverse surface is placed adjacent the transverse shaft surface and defines a sealing surface for substantially preventing fluid flow between the sealing surface and the transverse shaft face. An outer annular seal member is received on the outer surface of the main seal member co-axial with the shaft and sealingly engaged with the housing and main seal member to inhibit fluid flow therebetween. An inner ring is received in a groove formed in the inner surface of the main seal member and is circumferentially slidable relative to the main seal member.

In accordance with another aspect of the invention, a seal assembly includes a split annular main seal member including cylindrical inner and outer surface arranged co-axially, and a transverse sealing face having a seal area and a pressure relief area. The seal assembly further includes a split inner ring member at least partially recessed into the cylindrical inner surface and arranged co-axially with the inner surface. An O-ring seal is partially recessed into the outer cylindrical surface and arranged co-axially with the outer surface.

One advantage of the present invention is the provision of a new and improved high-pressure rotary seal.

Another advantage of the present invention resides in the provision of a high-pressure rotary seal that is effective and long-lasting without being unduly complex and expensive.

A further advantage of the present invention is found in the provision of a high-pressure rotary seal that also provides effective sealing at low fluid pressures.

Still another advantage of the present invention is the provision of a high-pressure rotary seal that is easy to install and replace, especially in closed-groove applications.

Yet another advantage of the present invention resides in the provision of a high-pressure rotary seal with an inner, labyrinth ring that exerts axial force on a main seal ring to urge the main seal ring into its operative, sealing condition.

A further advantage of the present invention is the provision of a high-pressure rotary seal which defines a relief chamber for preventing the exertion of excessive axial force on the main seal member as would result in damage to the seal from excessive friction.

Still other benefits and advantages of the present invention will become apparent to those of ordinary skill in the art upon reading and understanding the present specification.

BRIEF DESCRIPTION OF THE DRAWINGS

The invention may take form in certain components and structures, preferred embodiments of which are illustrated in the accompanying drawings which form a part hereof and wherein.

DETAILED DESCRIPTION OF PREFERRED EMBODIMENTS

Figure 4:
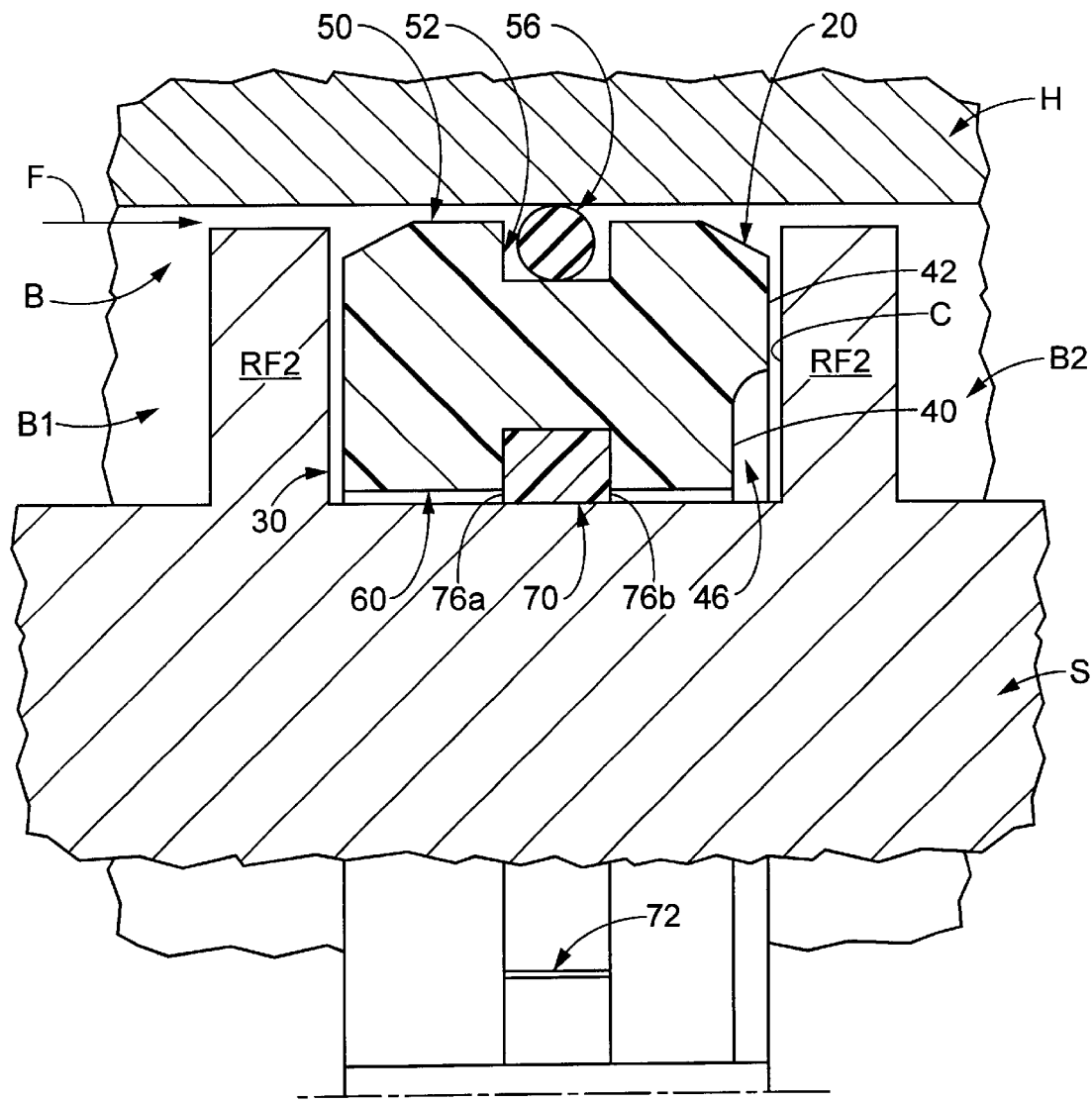
FIG. 4 is a partial cross-sectional view of the high-pressure rotary seal of FIG. 1 as installed in an operative position to inhibit fluid flow between a housing and a shaft supported for rotation relative to the housing.

Referring now to the drawings, wherein the showings are for purposes of illustrating a preferred embodiment of the invention only and not for limiting same, a high-pressure rotary face seal or seal assembly formed in accordance with the present invention is illustrated generally at 10. Due to its overall annular conformation, the seal 10 defines a central circular opening 12. With reference now also to FIG. 4, the seal 10 is adapted for co-axial placement on an associated shaft S so that the seal 10 circumferentially surrounds the shaft S. The shaft S comprises first and second radially enlarged flanges RF1,RF2 which are axially spaced-apart to define a circumferential groove therebetween adapted is for receipt of the seal 10. Of course, the shaft S does not form a part of the present invention and may take a wide variety of other configurations.

The housing H defines a cylindrical bore B in which the shaft S is rotatably supported. In general, as is explained in detail below, the seal S inhibits fluid flow in the bore B between the shaft S and the housing H. As illustrated in FIG. 4, the seal 10 is positioned on the shaft S to inhibit fluid flow in a first direction (as indicated by the arrow F) from an upstream bore location B1 to a downstream bore location B2.

The seal 10 comprises a first or main annular seal member or ring 20. To facilitate installation of the seal 10 on an associated shaft S, the main seal ring 20 is split so that first and second faces 24,26 are defined and adapted for abutment when the seal member 20 is installed on an associated shaft S. (The faces 24,26 are illustrated herein as being circumferentially spaced-apart from each other only to facilitate an understanding of the invention). The faces 24,26 are planar or otherwise conformed to mate closely with each other to inhibit fluid flow therebetween. The main seal ring 20 is preferably a one-piece construction manufactured from plastic, metal, a composite material or any other suitable material which has a low coefficient of friction and is resistant to wear. One preferred material is commercially available filled polyetheretherketone (PEEK) thermoplastic.

Figure 3:
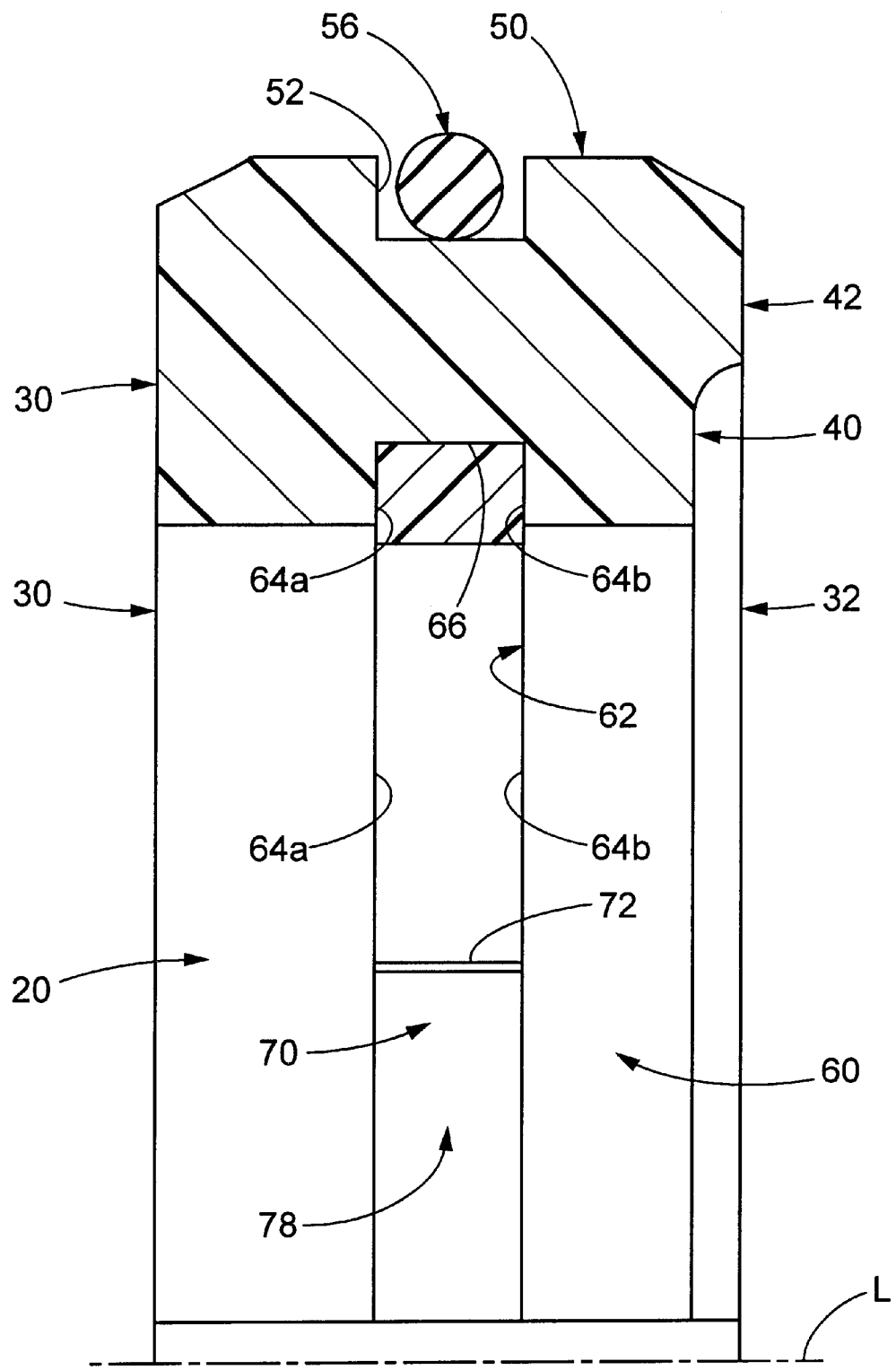
FIG. 3 is a sectional view as taken along line 3—3 of FIG. 1.

With reference now also to FIG. 3, the main seal ring 20 has a longitudinal axis L and comprises opposite first and second transverse faces 30,32 at its opposite axial ends. The first transverse face 30 is preferably planar but may be otherwise conformed as desired. The second transverse face 32 defines a sealing face for mating in a substantial fluid-tight relationship with the radially enlarged flange RF2 of the associated shaft S or another like structure of the shaft.

Specifically, the sealing face 32 comprises two distinct regions defined in the main seal ring 20: (i) a relief area 40; and, (ii) a seal area 42. The seal area 42 is defined by a planar surface which is circumferentially coextensive with the main annular seal ring 20. With reference to FIG. 4, the seal area 42 is adapted for substantial fluid-tight abutment with a transverse face C of the radial flange RF2 (the space illustrated between the seal area 42 and the flange RF2 is for ease of understanding the invention only). The relief area 40 is defined by a grooved or recessed area in the main seal ring 20 which is also circumferentially co-extensive with the main seal ring 20. The relief area 40 is defined in the main seal ring 20 at a radially inward location relative to the seal area 42.

As illustrated in FIG. 4, the relief area 40 is axially spaced from the face C of the radial flange RF2 so that an annular pressure relief region or chamber 46 is defined between the face C and the relief area 40 of the main seal ring 20 when the seal 10 is installed in its operative position on an associated shaft S. Thus, the relief area 40 and the seal area 42 define the sealing face 32 of the seal 10 with a select configuration that has been found to provide effective sealing and long seal life as is described in further detail below.

The main seal ring 20 also defines a peripheral face 50 which is preferably cylindrical or which otherwise conforms in shape to the shape of the bore B formed in the housing H. At least one groove or recess 52 is defined in the peripheral face 50 and is adapted to receive an outer resilient sealing member or band 56 therein. The groove 52 is circumferentially co-extensive with the main seal member 20 and the resilient sealing member 56 is annular in overall configuration. The resilient sealing member 56 is dimensioned to have an inner diameter which is no greater than the outer diameter of the main seal ring 20 in the region of the groove 52. Thus, when installed in its operative position in the groove 52, the resilient sealing member 56 exerts a radially inwardly directed force on the main sealing ring 20 and forces the split faces 24,26 of the ring 20 into sealing abutment with each other.

The resilient sealing member 56 has a cross-sectional dimension sufficiently large relative to the depth of groove 52 so that, when the resilient sealing member 56 is operatively placed in the groove 52, the sealing member 56 projects radially outward beyond the peripheral surface 50 of the main seal ring 20 around the entire circumference thereof. On the other hand, the width of the groove 52 is preferably larger than the cross-sectional dimension of the seal 56 to allow limited axial movement of the main seal ring 20 relative to the seal 56. Preferably, the resilient sealing member 56 comprises an O-ring seal (with a circular cross-section) made from a conventional material such as a fluorocarbon elastomer.

With reference again to FIG. 4, it may be seen that when the seal assembly 10 is operatively positioned about an associated shaft S in a housing H, the resilient sealing member 56 engages the housing H and forms a fluid-tight seal between the housing H and the main seal ring 20. Also, the engagement of the resilient sealing member 56 with both the housing H and the main seal ring 20 prevents relative rotation therebetween when the shaft S rotates. As noted, limited axial movement of the main seal ring 20 is possible, even when the sealing member 56 is engaged with the housing H, due to the groove 52 being slightly wider than the cross-sectional dimension of the sealing member 56. Of course, when the sealing member 56 has a circular cross-section, this limited axial movement of the main seal ring 20 is facilitated. Also, it should be noted that the resilience of the sealing member 56 allows the main seal ring to be "split" for installation, even when the sealing member 56 is present in the groove 52.

The main seal ring 20 also defines a cylindrical inner surface or face 60 adapted for circumscribing the shaft S between the flanges RF1,RF2 as illustrated in FIG. 4. A groove 62 is formed into the inner cylindrical surface 60. The groove 62 is also circumferentially co-extensive with the main seal ring 20 and is preferably defined by planar side surfaces 64a,64b which are parallel to the transverse faces 30,32 of the ring 20, and a bottom surface 66 which is also cylindrical and concentric with the main seal ring inner surface 60.

Figure 1:
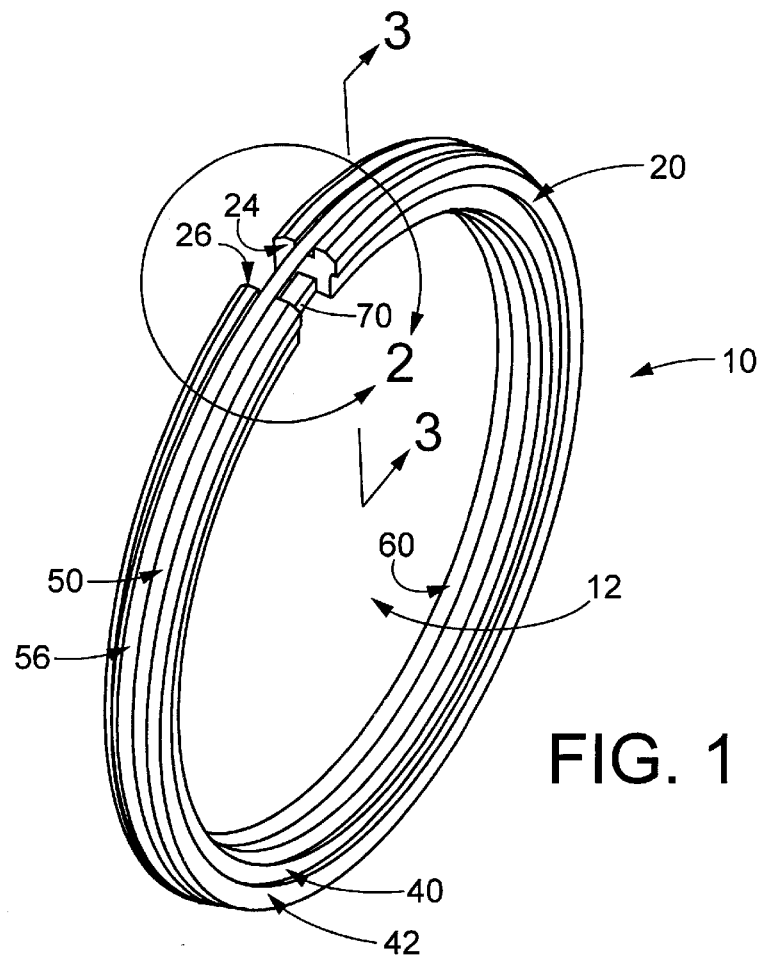
FIG. 1 is a perspective view of a high-pressure rotary seal formed in accordance with the present invention.
Figure 2:
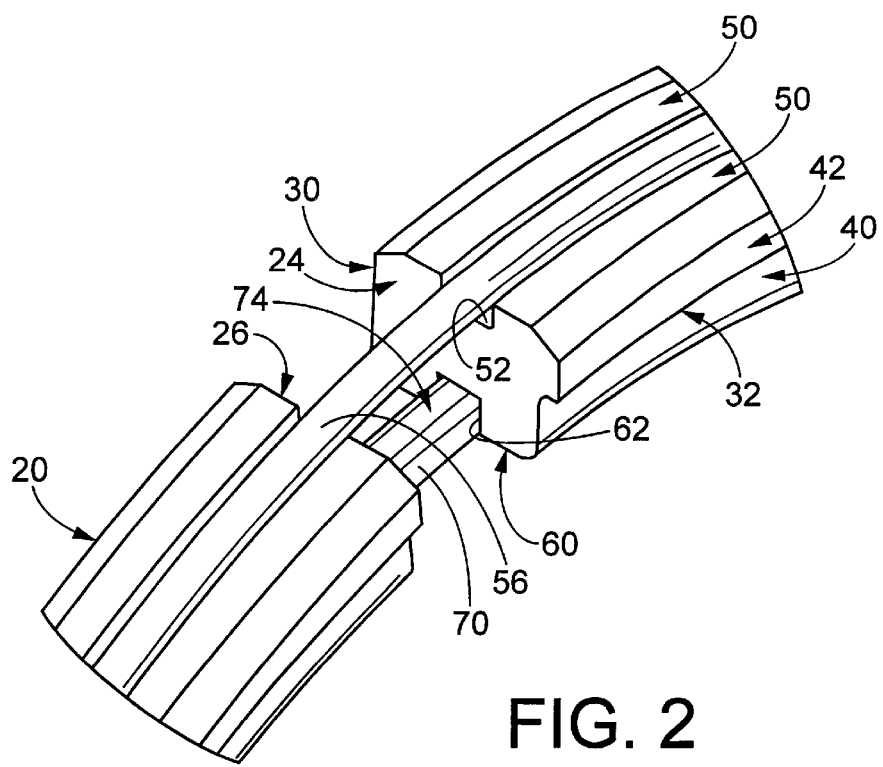
FIG. 2 is a greatly enlarged portion 2 of FIG. 1.

An inner or labyrinth ring 70, formed from the same material as the main seal ring 20 or any other suitable plastic or other material, is positioned in the groove 60 and is preferably circumferentially co-extensive therewith. The labyrinth ring 70 is also split at 72 so that it is also easily installable on an associated shaft S with the main seal ring 20. As is illustrated in FIGS. 3 and 4, the inner labyrinth ring 70 is adapted to be slidably received in the groove 62. More particularly, the labyrinth ring 70, itself, is defined by an outer cylindrical surface 74 (FIG. 2) that abuts the bottom surface 66 of the groove 62, and side surfaces 76a, 76b (FIG. 4) that are parallel to the groove side surfaces 64a, 64b. An inner cylindrical surface 78 of the labyrinth ring 70 is adapted to be closely received on the outer surface of the associated shaft S. Most preferably, the labyrinth ring 70 defines an inside diameter minimally less than the outside diameter of the associated shaft S so that when the labyrinth ring 70 is operative placed on the shaft S, it is urged to rotate with the shaft while the main seal ring 20 is restrained against rotation by the frictional engagement of the outer seal member 56 and the housing H. Those of ordinary skill in the art will recognize that, as fluid F (FIG. 4) acts on the labyrinth ring 70 and forces the ring 70 axially toward the radial flange RF2, the labyrinth ring 70 will urge the main seal member 20 in the same direction to engage the sealing area 42 of the face 32 with the surface C of the flange RF2 as is required for effective sealing. Thus, while the labyrinth ring 70 does not, itself, act as a seal, it does act to urge the main seal ring 20 into its operative sealing position.

Figure 5:
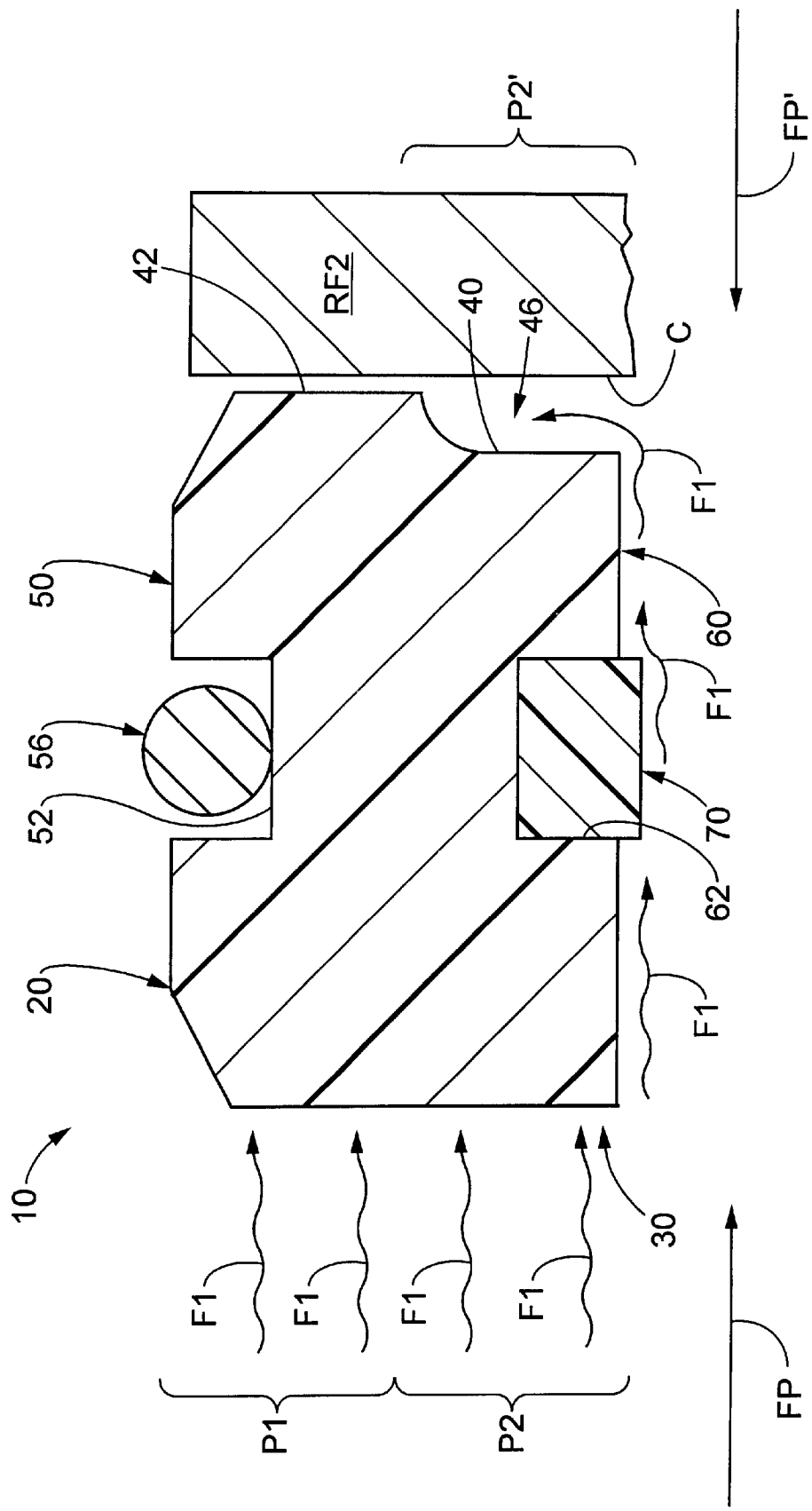
FIG. 5 is a schematic cross-sectional view illustrating operation of a high-pressure rotary face seal formed in accordance with the present invention; and, FIG. 6 is a diagrammatic illustration of a typical closed-groove application for a plurality of seals formed in accordance with the present invention as used to seal multiple fluid ports.

With reference now to FIGS. 4 and 5, operation of the seal assembly 10 is described. As noted above, the seal assembly is installed about the associated shaft S that rotates within the housing H. The outer sealing member 56 of the seal assembly 10 sealingly engages the housing H and the main seal ring 20 to prevent fluid flow therebetween. As indicated by the arrows F1, fluid flows against the face 30 of the main seal ring 20 and forces the seal area 42 into substantially fluid-tight engagement with the rotating flange RF2.

The fluid F1 exerts an overall first fluid pressure FP on the main seal ring 20 that comprises the pressure components P1,P2. The fluid F1 works past the labyrinth ring 70 and fills the pressure relief chamber 46 (where it is trapped due to the seal formed between the sealing area 42 and the flange RF2). The fluid F1 in the pressure relief chamber 46 exerts a relief fluid pressure FP' on the seal ring 20 in a direction opposite to the direction of the first fluid pressure FP. The relief fluid pressure FP' has a magnitude P2' that is equal to the pressure component P2 of the first fluid pressure FP. Thus, only the fluid pressure component P1 of the first fluid pressure FP exerts a net force on the main seal ring 20. This, then, limits the pressure at which the seal area 42 is forced into the surface C of the radial flange RF2 so that excessive friction does not overheat the main seal ring 20.

Figure 6:
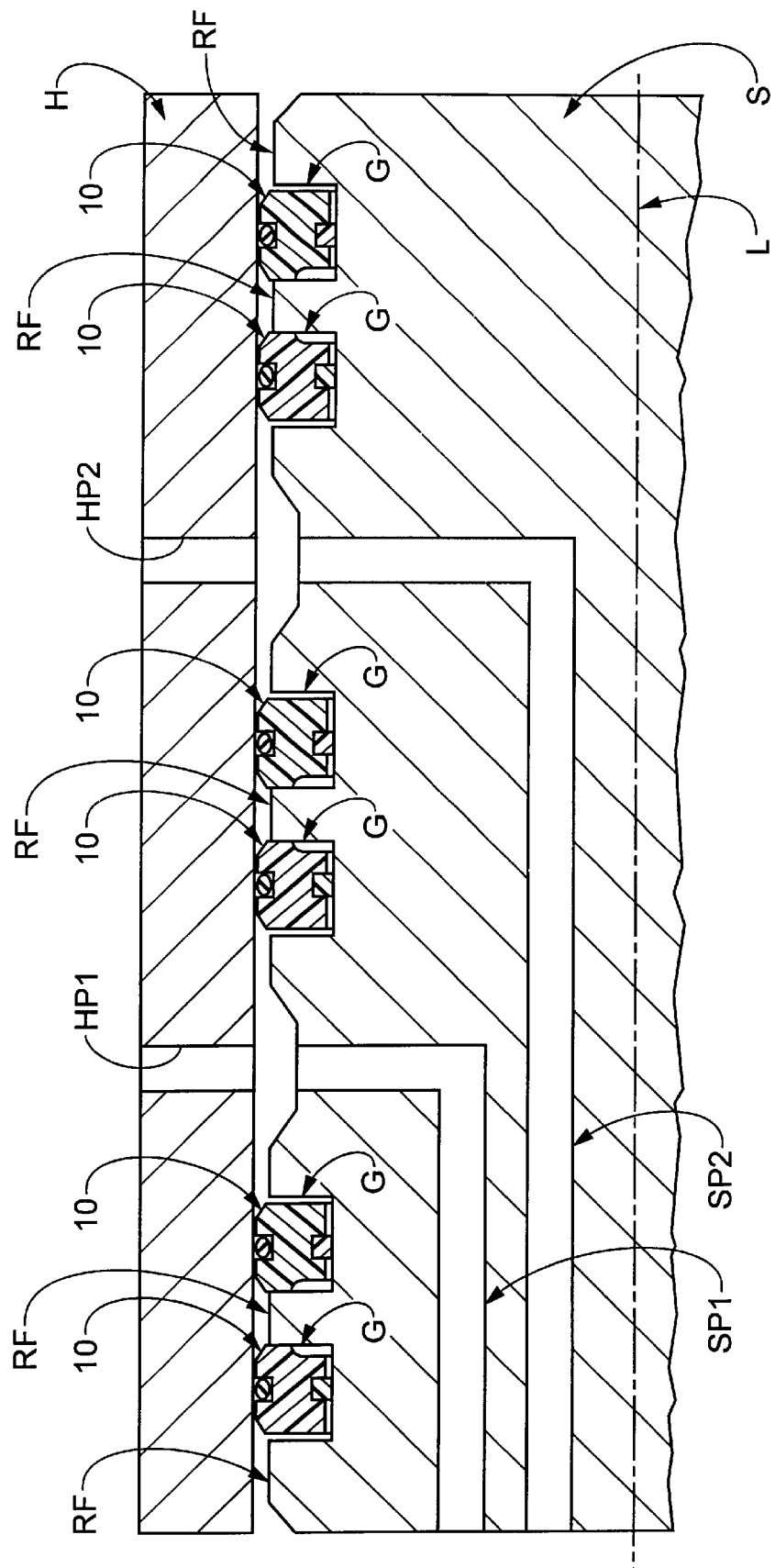

A typical application for seals 10 formed in accordance with the present invention is diagrammatically illustrated in FIG. 6. A shaft S includes a plurality of circumferential grooves G defined therein so that radial flanges RF are formed. The grooves each receive a seal 10 formed in accordance with the present invention. The shaft S, with the seals 10 located in their respective grooves G is inserted into the closed housing H. In its operative position, the shaft S is rotatably supported relative to the housing H, and axially positioned so that fluid from housing passages HP1,HP2 is communicated to passages SP1,SP2 formed in the shaft S, respectively. The seals 10 are positioned to prevent fluid communication between the passages HP1,SP2 or HP2,SP1, and to prevent escape of fluid from between the shaft S and housing H as described above.

The invention has been described with reference to preferred embodiments. Obviously, modifications and alterations will occur to others upon reading and understanding the preceding specification. It is intended that the invention be construed as including all such modifications and alterations insofar as they fall within the scope of the following claims.

Having thus described the preferred embodiments, the invention is claimed to be:

1. A rotary seal comprising:
   a main seal member defined as a one-piece construction from a material comprising PEEK thermoplastic, said main seal member defined in an annular conformation by a peripheral surface, an inner surface defining a central opening of the main seal member, and first and second faces arranged transverse to the peripheral and inner surfaces, one of said transverse faces defining a sealing face comprising: (i) an annular seal area; and, (ii) a relief area defined by an annular groove recessed into said sealing face relative to said seal area;
   a resilient annular sealing member circumscribing said main seal member and projecting radially outwardly from said peripheral surface of said main seal member; and,
   an inner ring member slidably received in a groove defined in the inner surface of the main seal member, said rotary seal adapted for coaxial placement on an associated shaft that is rotatably supported relative to an associated housing whereby, when said seal is coaxially placed on said associated shaft, said seal area slidably and sealingly abuts a transverse face of said associated shaft, said resilient annular sealing member sealingly engages said associated housing and fixes said main seal member non-rotatably to said associated housing and said inner ring member is closely and axially slidably received on said associated shaft and adapted to exert axial force on and urge said main seal member in a first direction in response to fluid pressure exerted on said inner ring member in said first direction.

2. The rotary seal as set forth in claim 1 wherein said sealing face comprises a planar surface adapted for sealingly engaging a planar face of said transverse surface of said associated shaft in a substantially fluid-tight manner.

3. The rotary seal as set forth in claim 1 wherein said peripheral surface comprises a peripheral groove defined therein, wherein said resilient annular sealing member is positioned in said peripheral groove.

4. The rotary seal as set forth in claim 3 wherein said resilient annular sealing member comprises an O-ring having a circular cross-section defining a diameter and wherein said peripheral groove is dimensioned to have an axial width larger than said diameter of said O-ring whereby said O-ring is adapted for axial movement relative to said peripheral groove in response to fluid pressure exerted on one of said transverse faces of said main seal member.

5. The rotary seal as set forth in claim 3 wherein said main seal member is split and defines first and second split faces, said resilient annular sealing member urging said split faces into substantially fluid-tight abutment.

6. The rotary seal as set forth in claim 5 wherein said inner ring member is axially split and adapted for frictional engagement with said associated shaft so that said inner ring member rotates with said shaft relative to said housing and said main seal member.

7. A seal assembly comprising:

an axially split inner ring member;

an axially spilt main annular seal member circumferentially surrounding said inner ring member and defining an annular sealing face; and, an O-ring seal member received in a groove defined by a peripheral surface of said main seal member, said O-ring seal member projecting radially outwardly from said peripheral surface and axially movable in said groove toward and away from said sealing face, wherein said seal assembly is adapted for placement co-axially on an associated shaft that is rotatably supported relative to an associated housing, whereby said inner ring member is axially slidable on said associated shaft in response to fluid pressure; said sealing face is adapted to sealingly and slidably engage a transverse face of the associated shaft; and, said O-ring seal member is adapted to sealingly and non-rotatably engage the associated housing and inhibit fluid flow between the peripheral surface of the main seal member and the associated housing.

8. The seal assembly as set forth in claim 7 wherein said main seal member defines a central opening adapted for coaxial receipt of the associated shaft, said central opening defined by an inner cylindrical surface of said main seal member including a groove defined therein, wherein said inner ring member is seated in said groove and transfers axial force to said main seal member when fluid exerts axial force on said inner ring member.

9. The seal assembly as set forth in claim 7 wherein said sealing face of said main seal member comprises:

a radially outwardly located annular seal area; and, a relief area recessed axially into said main seal member at a location radially inwardly adjacent said seal area, whereby, when said seal assembly is operatively placed on said associated shaft in said associated housing, a pressure relief chamber for receipt of fluid is defined between said transverse face of said associated shaft and said relief area.

10. The seal assembly as set forth in claim 7 wherein said main seal member is a one-piece construction comprising PEEK thermoplastic.

11. An apparatus comprising:

a housing defining a cylindrical bore;

a shaft co-axially supported in said bore for rotation relative to said housing, said shaft comprising a transverse face defined by one of a groove and a flange; and, a seal assembly positioned co-axially on said shaft and radially between said shaft and housing for inhibiting fluid flow between said shaft and said housing, said seal assembly comprising:

a main seal member defined by at least an inner surface, an outer surface, and first and second side surfaces arranged transverse to said inner and outer surfaces, said second transverse surface placed adjacent said transverse surface of said shaft and defining a sealing surface for substantially preventing fluid flow between said main seal member and said transverse face of said shaft, an outer annular seal member received on the outer surface of said main seal member co-axial with said shaft and sealingly engaged with said housing and said main seal member to inhibit fluid flow therebetween, and, an inner ring received in a groove formed in the inner surface of said main seal member and circumferentially slidable relative to said main seal member.

12. The apparatus as set forth in claim 11 wherein said sealing surface of said main seal member comprises:

(i) an annular seal area adapted for substantial fluid-tight abutment with said transverse surface of said shaft; and, (ii) a relief area recessed into said sealing face relative to said seal area so that a pressure relief chamber is defined between said main seal member and said transverse surface of said associated shaft.

13. The apparatus as set forth in claim 12 wherein said main seal member and said inner ring are axially split to facilitate installation on said shaft.

14. The apparatus as set forth in claim 11 wherein said outer annular seal member comprises an O-ring seal defining a circular cross-section, and wherein said outer surface of said main seal member includes a circumferential groove therein adapted to receive said O-ring seal, said circumferential groove defined to have a width greater than a cross-sectional dimension of said O-ring seal so that said O-ring seal is axially movable in said groove relative to said main seal member in response to axial fluid pressure exerted on said main seal member.

\* \* \* \* \*